T. BROWN.
MANURE SPREADER.
APPLICATION FILED MAY 19, 1913.

1,188,725.

Patented June 27, 1916.

Witnesses
H. H. Lybrand
Stanley W. Cook

Inventor
Theophilus Brown
By H. H. Bliss
Attorney

THE COLUMBIA PLANOGRAPH CO., WASHINGTON, D. C.

UNITED STATES PATENT OFFICE.

THEOPHILUS BROWN, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,188,725.

Specification of Letters Patent.

Patented June 27, 1916.

Application filed May 19, 1913. Serial No. 768,631.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in portable farm implements typified by manure spreaders each of which has a mechanism of the character of a rapidly rotating reel with radially projecting fingers for the purpose of engaging with, pressing against, lifting and throwing backward, the rapidly detached portions of a load varying in its consistency, the load being fed to the aforesaid device by means of an apron which is carried by two parallel chains to which are connected the elements of the supporting part of the conveyer, generally parallel slats arranged transversely of the chains. These parts are mounted in the vehicle body which confines the load that is supported upon the apron, this load being conveyed slowly rearward between the sides of the vehicle body and against the beater. The load consists generally of masses of manure, the sub-masses through any load varying from each other greatly in their consistency and weight. The fingers of the beater or distributer react upon the advancing load during the first part of each rotation. When those at one end of the beater come in contact with a sub-mass of the load which is stiffer, heavier or more solid than the adjacent sub-mass at the other end of the beater, the result is to tend to push forward upon the first said mass and impede the forward travel of the corresponding side of the conveyer which is responded to by a stoppage of the chain and a distorting strain upon the elements of the conveyer.

The present invention relates to devices by which the conveyer, as an entirety, can have its tension uniformly adjusted and regulated, and by which also there shall be compensation for any result such as aforesaid from the beater acting non-uniformly across the load; and by which also the apron structure can be permitted to adjust itself properly in case any errors are made, manually, when positioning the adjusting devices.

Figure 1:
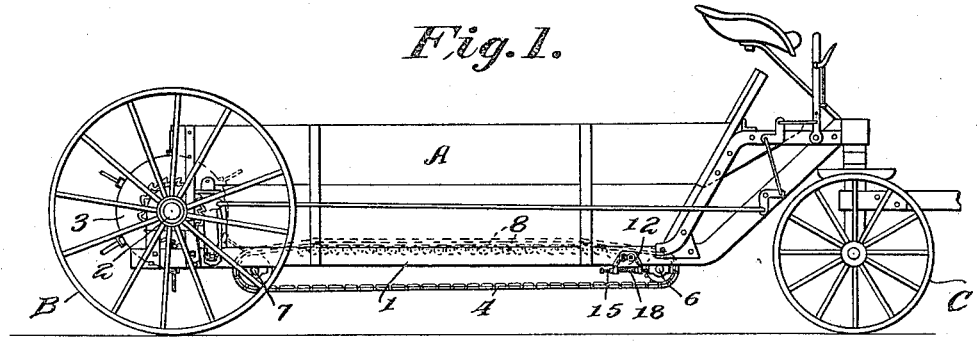
Figure 2:
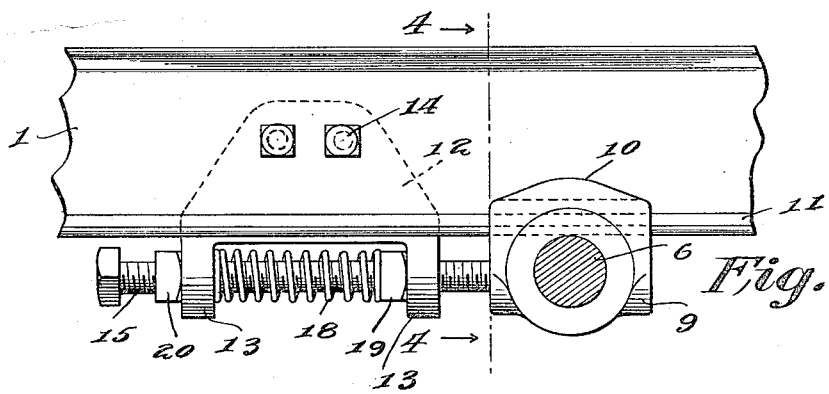
Figure 3:
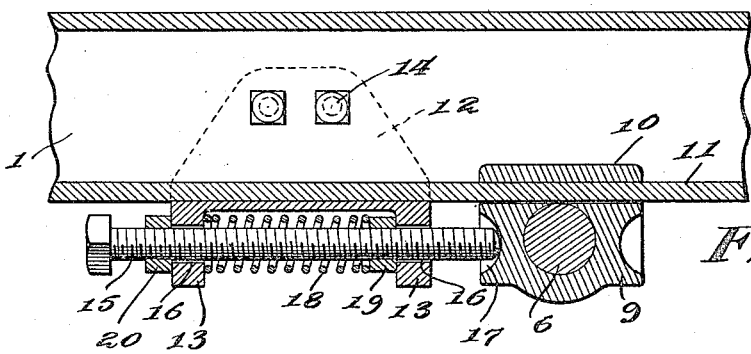
Figure 4:
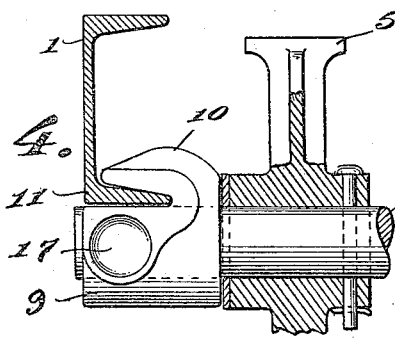

Of the drawings, Figure 1 is a side elevation of a manure spreader showing my improved equalizing device mounted upon the forward end of one of the sills; Fig. 2 is a vertical longitudinal fragmentary sectional view through the forward apron shaft just inside the sill; Fig. 3 is a longitudinal vertical sectional fragmentary view through the center of the adjusting bolt, and Fig. 4 is a transverse vertical sectional view on the line 4—4 of Fig. 2.

Referring to the drawings Fig. 1 shows a well known form of manure spreader comprising the body part A, rear wheels B, and a forward truck C. The body part is carried upon the pair of sills 1—1, which in the form of machine illustrated extend from beneath the rear axle 2 forward and upward to a point above the front truck C. A large beater or distributing cylinder 3 surrounds the rear axle, and is provided with mechanism whereby it receives a rapid rearward rotation from the ground wheel V.

An endless apron 4 forms the bottom of the load carrying chamber and extends from the front of the machine rearward to points immediately adjacent the beater 3. This apron 4 comprises a series of parallel slats linked together by two or more chains which ride upon the sprocket wheels 5. The sprocket wheels are carried upon two parallel shafts 6 and 7 positioned, one at the forward, and the other at the rear of the machine. The upper flight of the apron carries the load and travels rearward at a slow rate delivering the material against the teeth of the rapidly rotating distributer. Any well known manner of driving the apron may be employed, such as a train of speed reducing gearing inter-connected between the rear axle 2, and the rear apron carrying shaft 7. The upper stretch of the apron is supported upon a series of rollers 8 which reduce the friction between the heavily loaded apron, and the body of the machine.

In order to take up slack in the apron due to its stretching or in case of tightening of the apron for the purpose of relieving the tension, I have provided an adjusting device whereby the forward apron carrying shaft 6 may be moved longitudinally forward or backward with relation to the sills. Two adjusting devices are used on each machine, one being positioned at each side and operate upon the shaft carrying bearings 9. The adjusting devices are identical and a description of one will suffice for both.

In the present embodiment of my invention the adjusting devices are shown in connection with a manure spreader having U-shaped channel bars forming its side sills. It is obvious that the device may be modified in order to adapt it to use in connection with sills of other form. Each end of the forward apron carrying shaft 6 extends through a bearing 9 provided on its upper surface with a lip 10, which extends over the lower flange 11 of the channel sill 1. This lip provides a support for the bearing, and at the same time permits its longitudinal movement on the sill. In the present instance the bearings are held outward against the flanges 11 by pinning the sprockets 5 upon the shaft 6 immediately adjacent thereto.

A flange 12 provided with two spaced downward extending ears 13, 13 is secured to the outer face of the sill 1 at a point slightly in the rear of the shaft 6 by means of two bolts 14. An elongated bolt 15 extends through the alined openings 16 in the ears 13. The threaded end of the bolt 15 extends forward and abuts against one side of the bearing 9. A socket 17 is formed in each side of the bearing 9 to receive the thrust and assist in positioning the bolt 15. The sockets are formed on each side of the bearing 9 in order that the same casting may be used for either the right or left hand side of the machine, it being obvious that if the bearing shown in Fig. 3 were positioned upon the sill at the opposite side of the machine, the face against which the bolt 15 abuts would extend forward instead of rearward.

The openings 16 are considerably larger than the bolt 15 and permit its ready movement backward or forward. A heavy coiled spring 18 is placed around the threaded bolt 15 between the two ears 13, and a nut 19 is positioned on the bolt between the forward end of the spring and the rear face of the forward ear 13. A second nut 20 is threaded upon the bolt 15 and abuts against the rear face of the rearwardly positioned ear 13.

The bearings 9 are fitted to their guideways with looseness, as will be seen in Figs. 3 and 4, so that there can be more or less swinging movement of each and corresponding swing of the shaft 6, cramping or binding of the shaft being avoided, and each bearing being susceptible of more or less movement, transversely of the shaft, independently of the other.

I am aware of the fact that others have provided adjusting means for longitudinally positioning the forward apron carrying shaft. My invention is, however, radically different from that and possesses advantages which cannot be obtained by rigid adjustment. The rearward movement of the forward apron carrying shaft is entirely resisted by the action of the springs 18, thus permitting a flexible system which relieves the apron driving mechanism of a very considerable strain, particularly in starting under a heavy load.

A further improvement is the ease with which adjustment can be made for taking up or increasing the slack in the apron. Thus, for example, in the old form of adjustment the movement of each bearing forward or rearward must be exactly the same in order to keep the shaft in alinement, and prevent stretching one side of the apron, with the incident disadvantages such as uneven running, and tendency to throw the apron against one side or the other of the machine. With my improved device an automatic equalization is obtained whereby uneven adjustment due to carelessness or other causes do not affect the efficient operation of the machine, the bearings causing an equalization between the two ends of the shaft whereby the bearings are automatically kept in proper alinement and the apron at a proper tension.

The nut 19 provides an abutment on the bolt 15 against which the spring 18 operates to hold the bearing 9 forward, with yielding force. An adjustment of the bolt 15 forward or rearward with respect to its supporting flange 12 is secured by screwing it forward or rearward through the nut 19. The clearance between the nut 19 and the flange 12 is such that the nut is prevented from rotating. If it is found desirable to vary the tension upon the spring 18 without altering the position of the bearing 9 with respect to the sill this may be accomplished by relative adjustment between the bolt 15 and nut 19, but without changing the position of the nut 20 upon the bolt.

The bearings 9 are both slidable along the flanges 11, longitudinally with relation to the frame or body of the spreader, and are also inwardly separable from these flanges, being held apart and in place by the forward apron shaft. The sprocket wheels 5, each of which is detachably secured to the shaft and when the pin holding it is removed is free to be moved along the shaft, hold the bearings in place and in proper engagement with the flanges 11, as has been described. In operation it is frequently necessary to remove the apron, and this can be readily accomplished, as it is merely necessary to remove the pins that fasten the sprocket wheels to the transverse supporting shaft and then slide them inwardly, thus releasing the bearings 9 which may move inward and from engagement with the flanges 11, whereupon the apron-supporting parts may be readily dropped down and separated from the frame.

By forming the bracket 12 in the way shown, that is to say, with two abutment ears 13, the adjusting screw is provided with a long base support, the ears providing a space within which the spring 18 is placed and protected. The nuts 19 and 20 upon the screw bolt may be adjusted such distance apart that both simultaneously engage with the faces of the perforated ears 13, thus distributing the strains over the screw longitudinally.

While I have herein referred more particularly to these fertilizer distributing implements, I do so because of their being typical of the machines which can advantageously embody my improvements in that each has a distributing cylinder so arranged as to unequally react upon the apron system for supplying the load.

What I claim is:

1. In a distributing machine having a load-carrying body, a distributing beater at the rear, an apron constituting the support for the load to be distributed and supporting shafts for the apron, longitudinal guide flanges supported by the body frame, bearings for one of the apron-supporting shafts loosely engaging with the said flanges so as to be laterally separable therefrom, and movable along them lengthwise, and yielding adjusting means engaging with the said bearings for holding the apron under tension.

2. In a distributing machine having a load-carrying body, a distributing beater at the rear, an apron constituting the support for the load to be distributed and supporting shafts for the apron, longitudinal guide flanges supported by the body frame, bearings for one of the apron-supporting shafts loosely engaging with the said flanges so as to be laterally separable therefrom, and movable along them lengthwise, the bearings, when the apparatus is in working condition, being held apart and in engagement with the guide flanges by the said shaft, and two, independent, yielding adjusting means engaging respectively with the said bearings for holding the apron under tension.

3. In a distributing machine having a load-carrying body, a distributing beater at the rear, an apron constituting the support for the load to be distributed and supporting shafts for the apron, longitudinal guide flanges supported by the body frame, bearings in which one of the apron-supporting shafts is supported, the bearings having lips adapted to engage with the said flanges and being laterally separable therefrom and also freely movable along said flanges longitudinally, and means for securing the said bearings against longitudinal movement on the shaft, whereby the latter serves to hold them properly spaced apart and in engagement with the flanges.

4. In a distributing machine having a load-carrying body, a distributing beater at the rear, an apron constituting the support for the load to be distributed and supporting shafts for the apron, longitudinal guide flanges supported by the body frame, bearings for one of the apron-supporting shafts loosely engaging with the said flanges so as to be laterally separable therefrom, and movable along them lengthwise, wheels mounted on the shaft and engaging with the apron for driving it, the wheels being arranged close to the said bearings and serving to hold them in place, and detachable means for uniting the wheels with the shaft.

5. In a distributing machine having a load-carrying body, a distributing beater at the rear, a longitudinally movable apron constituting the support for the load to be distributed and adapted to carry it toward the distributer, and supporting shafts for the apron, one of which is movable for adjusting the tension of the apron, the combination of bearings in which the ends of the adjustable apron shaft are mounted, supporting guides with which the bearings engage and along which they are movable longitudinally, rigid flanges secured to the frame of the body in proximity to the said guides, and two independent longitudinally adjustable yielding adjusting screws mounted in the said rigid flanges and in engagement with the said bearings, the latter being provided with sockets to receive the ends of the adjusting screws.

6. In a distributing machine having a load-carrying body, a distributing beater at the rear, a longitudinally movable apron constituting the support for the load to be distributed and adapted to carry it toward the distributer, and supporting shafts for the apron, one of which is movable for adjusting the tension of the apron, the combination of bearings in which the ends of the adjustable apron shaft are mounted, supporting guides with which the bearings engage and along which they are movable longitudinally, rigid flanges secured to the frame of the body in proximity to the said guides, two independent longitudinally movable adjusting screws respectively engaging with the said bearings, independent spring tension devices acting respectively on the said screws for holding them in engagement with the bearings with yielding force, and means for adjusting the said tension devices independently of the longitudinal adjustment of the screws.

In testimony whereof, I affix my signature, in presence of two witnesses.

THEOPHILUS BROWN.

Witnesses:
G. P. EXTROM,
W. H. STEPHENS.

Copies of this patent may be obtained for five cents each, by addressing the "Commissioner of Patents, Washington, D. C."